May 14, 1946.   L. A. MAAS   2,400,125
BALANCED SUSPENSION FOR CHIMES
Filed Sept. 30, 1943   2 Sheets-Sheet 1

INVENTOR.
Louis A. Maas
BY Carlos G. Stratton
ATTORNEY.

May 14, 1946.   L. A. MAAS   2,400,125
BALANCED SUSPENSION FOR CHIMES
Filed Sept. 30, 1943   2 Sheets-Sheet 2
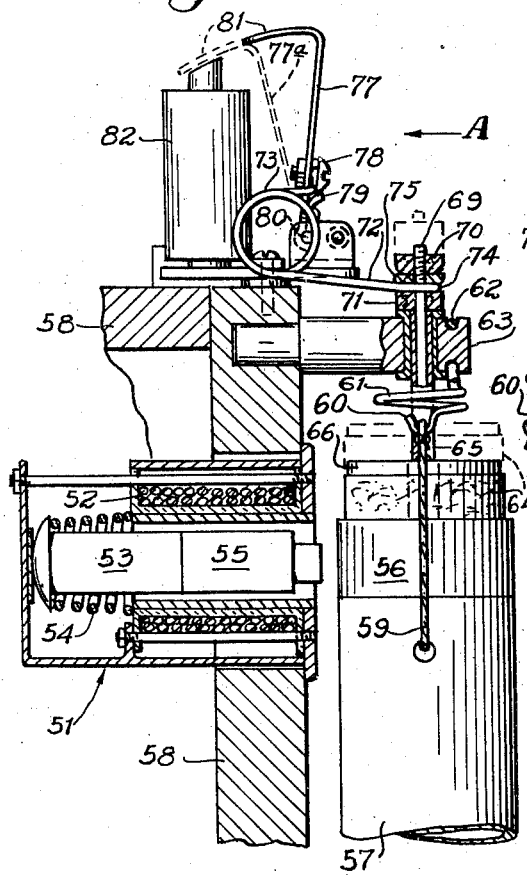
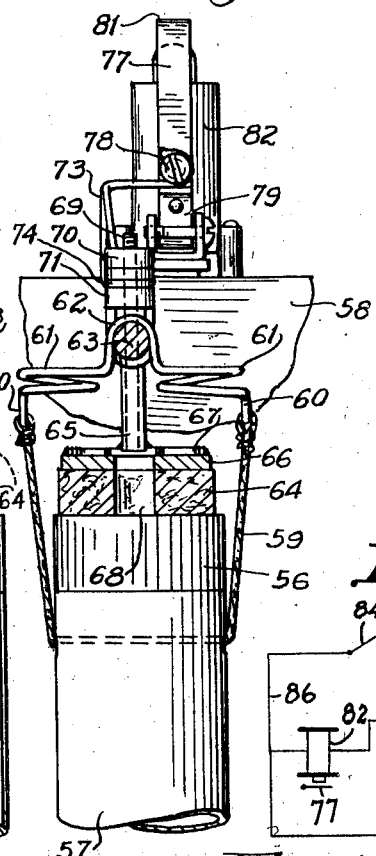
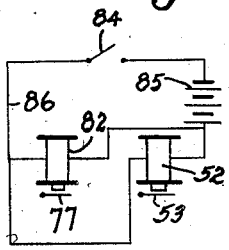
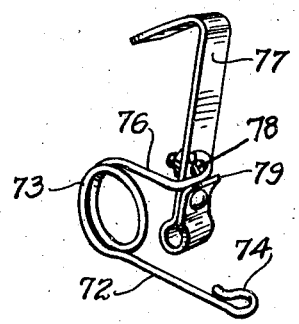
INVENTOR.
Louis A. Maas
BY Carlos G. Stratton
ATTORNEY.

Patented May 14, 1946

2,400,125

UNITED STATES PATENT OFFICE 2,400,125

BALANCED SUSPENSION FOR CHIMES

Louis A. Maas, Glendale, Calif.

Application September 30, 1943, Serial No. 504,475

14 Claims. (Cl. 116—169)

My invention relates to a balanced suspension for chime and has for its principal object to provide means for supporting an elongated chime element from a single pivotal support.

In practice, many such chimes are supported by means of a cord passed through opposite apertures in the chime. In order to adjust the suspension of the chime, it has heretofore been customary to shift the position of the cord within the chime. It is an object of the present invention to provide means for adjusting the suspension of the chime automatically without adjusting the position of the cord within the chime.

Another object of the invention is to provide single pivot means to support an elongated chime element.

Still another object of the invention is to provide a pivotal, one-point suspension for a chime whereby to produce a better tone.

A further object of the invention is to provide offset suspension means embodying the foregoing features, to make room for damping means also at the top of the chime.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 8 is a vertical section of an offset supporting element, together with damping means.

Fig. 9 is a front elevation of the embodiment shown in Fig. 8, looking in the direction of the arrow A.

Fig. 10 is a perspective view of an element of the damping mechanism shown in Figs. 8 and 9.

Fig. 11 is a diagrammatic view of a circuit comprised in the construction shown in Figs. 8 and 9.

Figure 1:
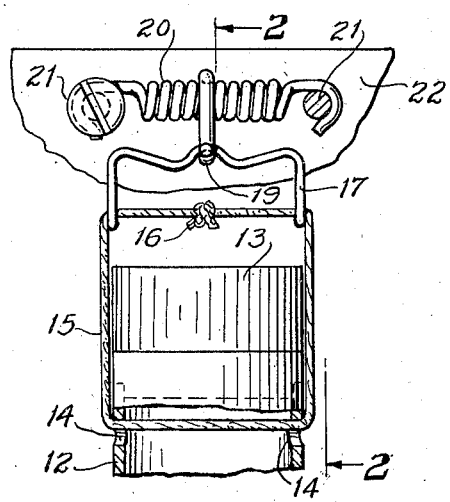
Fig. 1 is a broken elevation, partly in section, showing an embodiment of my invention.

Referring more in detail to the drawings, the reference number 12 generally designates a metallic chime that is either solid or tubular, but usually tubular. In the drawings, a non-metallic head 13 is shown within the upper end of the chime. The head 13 may be of Bakelite, plastic, wood, or other suitable material. The chime 12 is generally apertured with aligned openings 14, through which a cord 15 passes. The ends of the cord may be tied in a knot 16 above the chime.

A yoke 17 has hook members 18 at opposite ends thereof that engage the cord 15 at spaced points, as shown in Fig. 1. The yoke has a one-point, pivotal suspension upon a hook 19 that depends from a coil spring 20. The coil spring is supported at its ends by screws 21. The coil spring 20 resiliently supports the hook 19. Any suitable supporting base is shown at 22.

Figure 3:
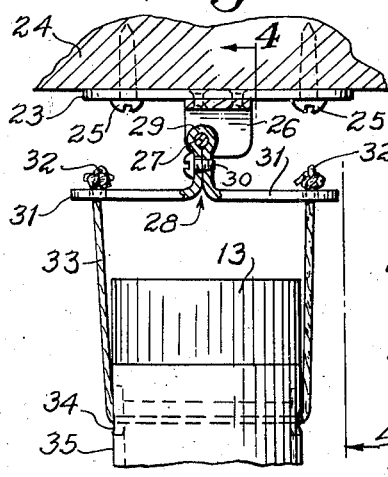
Fig. 3 is an elevational view, partly in section, of another embodiment of my invention.
Figure 4:
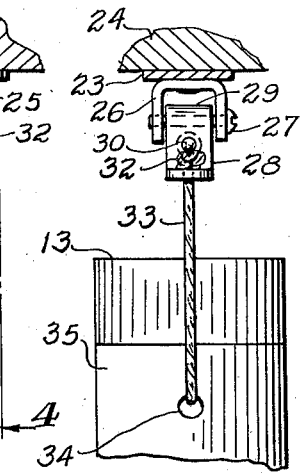
Fig. 4 is a side elevation looking in the direction of arrows 4—4 of Fig. 3.
Figure 5:
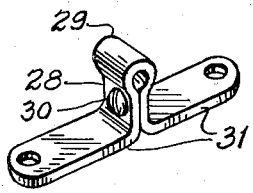
Fig. 5 is a perspective view of a rocker element employed in the embodiment shown in Figs. 3 and 4.

In the form shown in Figs. 3 to 5, a plate 23 is fastened beneath a suitable support 24 by screws 25. A support 26 depending from the plate 23 carries a pivot bolt 27 upon which swings a rocker 28. The rocker 28 has a loop 29 that engages the bolt 27. A short screw 30 aids in maintaining the rocker 28 in its position upon the bolt 27.

Laterally arranged arms 31 on the rocker 28 support knotted ends 32 of a cord 33 which passes through apertures 34 in the chime 35.

Figure 6:
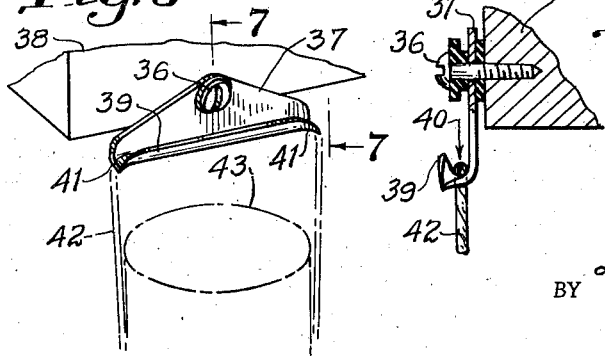
Fig. 6 is a perspective view of another form of my invention.
Figure 7:
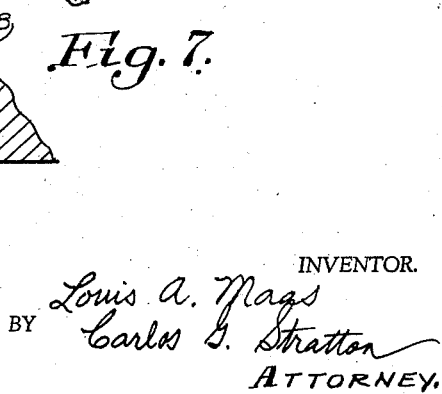
Fig. 7 is a section taken on the offset line 7—7 of Fig. 6.

In the form shown in Figs. 6 and 7, a bolt 36 pivotally mounts a plate 37 upon a support 38. The plate 37 has an upwardly bent lip 39, at its lower extremity, to provide a trough 40. The trough 40 dips down at its ends, as indicated at 41. The cord 42 is held in position along the plate 37 by means of the trough 40. The cord 42 supports the chime 43, as in Figs. 1 to 4.

Fig. 8 illustrates a striking means 51. It is to be understood that this striking means may be employed for striking the chimes in Figs. 1 to 4 and 6. This striking mechanism comprises a solenoid coil 52 and a core member 53. A compression spring 54 tends to withdraw the core member 53 from the solenoid coil 52 when the coil is de-energized. A non-magnetic extension 55 is provided for the core member to strike the head 56 of the chime 57, when the solenoid coil is energized. For more detailed explanation of the striking mechanism, reference is made to Klein Patent No. 1,813,171, issued July 7, 1931. The striking mechanism may be mounted within a vertical support 58 opposite a suspension chime.

In Figs. 8 and 9, the chime 57 is supported by a cord 59 that is tied to hooks 60 at the lower extremities of helical springs 61. An integral, substantially tangent bridge member 62 connects the springs 61 with each other and lies over a post 63 that projects horizontally from the support 58. The bridge member 62 is offset with respect to the vertical axis of the chime 57. It is also to be understood that there is a free rocking motion of the bridge member 62 upon the post 63.

Since a chime tube unit and especially the top thereof, when intoned by a hammer or other impact member, begins to swing in a pendulous line, it produces a number of definite disadvantages and undesirable effects. For instance, a swinging chime unit, when intoned produces a wavy and uncertain tone. A swinging chime uncertainly relates its position to the impact member or hammer for a second or third note or the production of a succession of single notes; and the improper position of the chime to the hammer, may yield, according to the distance thereof from the hammer, a tone too soft, or a tone too loud, or the intonation of the chime may even be dampened by too close a proximity to the hammer at the time of its release, due to the oscillatory or pendulous motion of the upper part of the chime.

The disadvantages above set out are overcome by the yielding supporting means 61, which illustrates a spring means having an inherent, normal straight line tension, that tends always to resume its straight line action regardless of the oscillatory or vibratory back and forth motion of the chime initiated by the impact member when striking the chime. This back and forth movement of the upper part of the chime produces an intension of the spring units 61, which is equivalent to a slight stretch and which tends almost immediately to stop the oscillation or back and forth motion of the upper part of the chime as the spring means resumes its normally inherent straight line motion, thereby causing the oscillatory movement of the chime to be transferred or absorbed by its vertical or up and down motion in line with the normal action of the spring. This up and down motion of the chimes completely eliminates the undesirable vibrato effect, which is produced by a swinging chime, and in addition, it maintains the top of the chime in position at all times to receive its intoning impact.

The damping means shown in Figs. 8 and 9 comprises a felt pad 64 that is mounted to be moved into and out of engagement with the head 56 of the chime. In its engaging position, the pad 64 dampens the tone of the chime. The engaged position is shown in full lines in Figs. 8 and 9. The retracted, non-damping position of the felt pad is shown in broken lines in Fig. 8.

A mounting plate 66 for the pad 64 may be of suitable material such as lead, to weight the pad. A stem 65 is mounted upon the plate 66 by means of a cross wire 67 that spans a vertical opening 68 through the pad 64 and plate 66.

The upper end of the stem 65 may be threaded, as at 69, to receive a nut 70 of suitable material such as leather. A therewith spaced nut 71 which is also of such suitable material maintains in proper position a resilient lever arm 72 tangent to a coil spring 73. A loop 74 at the end of the arm 72, shown in Fig. 10, is the immediate part of the arm 72 between the nuts 70 and 71. A felt washer 75 may be interposed between the loop 74 and the upper nut 70, if desired.

The opposite arm 76 of the coil 73 is bolted to an armature 77, as shown at 78. The armature is folded upon itself at its lower end, as seen at 79, to provide a loop for pivoting upon a pin 80. The upper end 81 of the armature 77 is bent slightly downward, as shown.

A vertically mounted solenoid 82 is arranged to attract the armature 77 to the broken line position 77a in Fig. 8, when the solenoid 82 is energized. When the solenoid 82 is de-energized, the coil spring 73 is mounted to return the armature 77 to the full line position in Fig. 8. The damping mechanism is in its damping position when the armature 77 is in its full line position shown in Fig. 8, and when the armature 77 is moved to its attracted position 77a, the damping mechanism is thereby moved to its non-damping, broken line position shown in Fig. 8, due to the intermediary connecting mechanism. Fig. 11 diagrammatically illustrates the circuit employed by the construction shown in Figs. 8 and 9. A single manual switch 84 controls the circuit 86 for both the solenoids 52 and 82. A source is indicated at 85.

In the operation of the various forms of my suspension means, shown and described herein, the common feature is the single pivot to balance the chime without adjusting the suspension cord through the apertures in the walls of the chime.

Figure 2:
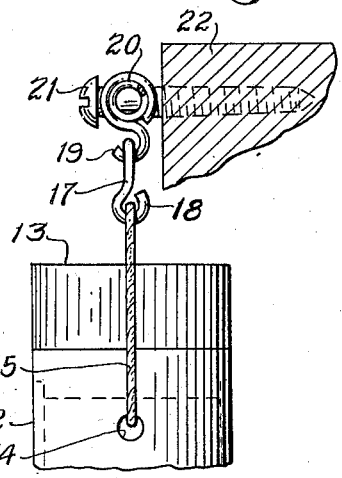
Fig. 2 is a side elevation, looking in the direction of arrows 2—2 of Fig. 1, and showing a helical spring element in section.

In the forms shown in Figs. 1, 2, 8 and 9, the springs 20 and 61 add a resilience to the support, in addition to the pivotal action. The tone of the chime is enhanced by having the non-rigid support and by transferring the oscillatory motion of the upper part of the chime occasioned by the striker to a vertically reciprocable motion in line with the normal action of the non-rigid support. Figs. 1 and 2 also employ the yoke whose ends may be quickly hooked under the cord 15 to produce the desired combination. It will be noted in each of the forms of the invention which are shown herein, the chime hangs vertically from the single pivot without adjustment of the cord through the chime.

The rocker 28 in Figs. 3 to 5 provides a similar pivotal action from a single pivot (the bolt 27). The cord 42 in Figs. 6 and 7 merely needs to be layed over the lip 39 into the trough 40 to suspend the chime 43 in position. The chime finds its own vertical position with respect to the pivot 36.

In the operation of the damping mechanism of Figures 8 and 9, the pivoted suspension bridge 62 is offset to permit space for the damping means. The weight 66 normally causes the damping pad 64 to drop to its damping position by gravity. To retract the damping mechanism, the solenoid 82 is energized, which attracts the armature 77 and thereby lifts the damping pad 64 from the chime, through the intermediary of the coil 73 and its tangent ends 76 and 72, acting as a bell crank, and through the connecting standard 65.

It is to be understood that the single manual switch 84 closes the circuit 86 for both the solenoids 52 and 82. Thus, upon closing the manual switch 84, the damping mechanism will be retracted and the striking mechanism will be actuated. Upon opening of the switch 84, the striking mechanism is retracted and the damping mechanism is moved to its damping position.

It is also believed clear that the striking mechanism 51 may be employed with each of the chimes herein. The core member 53 is withdrawn from the chime by the spring 54, when the solenoid coil 52 is de-energized. Energization of said coil 52 attracts the core 53 to a chime striking position.

While I have illustrated and described what I now regard as the preferred embodiments of my invention, the constructions are, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In a balanced suspension for chimes, a chime, means for depending the chime, pivot means, and a rocker having a swinging connection with the pivot means and in turn supporting the chime-depending means.

2. In resilient chime suspension means, a vertically resilient, pivotally mounted rocker, and cord means for depending a chime from the rocker.

3. In resilient chime suspension means, a rocker having a pivotal support and having means for engaging a chime supporting cord to depend at spaced points, that part of the rocker between the pivotal support and the respective cord depending points being resilient and cord means for depending a chime from the rocker at said points.

4. In resilient chime suspension means, spring means to be mounted upon a relatively stationary support, a pivot supported by the spring means for vertical resilience, a rocker pivotally supported upon the pivot and having means for engaging a chime-supporting cord, and cord means for depending a chime from the rocker.

5. In resilient chime suspension means, spring means to be mounted upon a relatively stationary support, and a pivot supported by the spring means for vertical resilience and in turn pivotally supporting a depending chime.

6. In combination, a hollow, tubular chime having substantially alined openings in the walls thereof, a cord passed through said openings and spanning the hollow interior of the chime, and a pivotally mounted rocker element engaged by the cord at the opposite sides of the pivot of the rocker and the portions of the rocker element opposite the pivot being resilient.

7. In combination, a hollow, tubular chime having substantially alined openings in the walls thereof, a single cord passed through said openings and tied to itself, forming an endless loop, and a pivotally mounted rocker element engaging the loop, the cord depending from the rocker at opposite sides of the pivot of the rocker, to provide a balanced suspension for the chime.

8. In combination, a hollow, tubular chime having substantially alined openings in the walls thereof, a cord passed through said openings, and a pivotally mounted rocker element having flexible portions thereof at opposite sides of the pivot, fastened to the cord, to provide a balanced suspension for the chime.

9. In a balanced suspension for chimes, a chime, a pivot, a flexible rocking yoke on the pivot, and cord means supporting the chime and in turn engagingly supported by the yoke at the opposite sides of the pivot, the portion of the yoke on the pivot being offset with respect to the connections of the cord with the yoke.

10. In combination, a chime, a cord for supporting the chime at an end thereof, damping means for engaging the end of the chime, a rocking yoke engaging the cord at opposite sides of the damping means, and a pivot, the yoke being arranged to pass over the pivot at a point offset with respect to the portions of the yoke engaging the cord at the sides of the damping means, the yoke providing a balanced suspension for the chime.

11. A means for suspending a hollow tubular chime unit in relation to a striker and for resisting oscillatory motion at the top of said chime unit when intoned by an impact member and producing an evenness of tone, said means comprising a flexible suspension means for said unit, and a yielding means supporting said suspension means, whereby to maintain the proper relation of the chime to the striker.

12. A means for suspending a hollow tubular chime unit in proper relation to a striker and for absorbing oscillatory motion of the upper part of said unit when intoned by a striker, said means comprising a flexible suspension for said unit, and a yielding means supporting said suspension means, said yielding means having a straight line movement under gravitational intension when said unit is intoned by the action of said striker on the upper part of said unit.

13. A means for maintaining a tubular chime unit in proper relation to an impact member and causing an oscillatory motion thereof initiated by the impact of said member to be offset and be absorbed, said means comprising a spring under normal gravitational intension by said chime unit, and a connection between said chime unit and spring, said spring and chime unit yielding in a straight line when said chime unit is intoned by said impact member.

14. In a balanced suspension for chimes, a chime, means for depending the chime, pivot means, and a spring rocker having a swinging connection with the pivot means and in turn resiliently supporting the chime-depending means.

LOUIS A. MAAS.